May 16, 1933.  D. R. POBJOY  1,908,787

CONNECTING ROD ASSEMBLY

Filed Oct. 4, 1929

INVENTOR
D. R. POBJOY
BY
Richards & Geier
ATTORNEY

Patented May 16, 1933

1,908,787

UNITED STATES PATENT OFFICE

DOUGLAS RUDOLF POBJOY, OF MAICOTTE, ENGLAND

CONNECTING ROD ASSEMBLY

Application filed October 4, 1929, Serial No. 397,318, and in Great Britain October 20, 1928.

I have filed an application in Great Britain No. 30,425 filed the 20th October 1928.

The present invention relates to a connecting rod assembly for use in internal combustion engines of the kind comprising radial cylinders.

According to this invention, said assembly comprises a master connecting rod and articulated connecting rods and has the characteristic feature that all the articulated rods can be removed by a simple turning movement of means carried on the big-end body and normally arranged to retain all the articulated rods against removal from said body. Said assembly preferably comprises a master connecting rod and articulated connecting rods, each of the latter being pivoted on a wrist-pin arranged in the big-end body, and all the wrist-pins being held against axial movement and removal by one or more members adapted to be moved into an inoperative position, in which all the wrist-pins can be readily removed from the big-end body, by a simple turning movement of said member or members relative to the big-end body.

The said big-end body may comprise a central ring and a number of bosses spaced therearound and interconnected by means of two spaced webs, a space being left between the latter for the reception of the bearing bosses on the inner ends of the connecting rods. The master-rod if separated from the big-end body, preferably is formed with two such bosses, the inner boss being arranged coaxially with two aligned bosses on the two webs and the outer boss co-axial with two aligned bosses which are formed on the two webs at a spaced distance from, and in radial alignment with, the above mentioned bosses.

The aforesaid wrist-pin retaining members may consist, for example, of two annular plates, each having a number of peripheral projections which, in the operative position of the plate, are engaged in undercut grooves formed in corresponding projections on the bosses on the front or rear web of the big-end body. A bolt which is passed through a wrist-pin accommodated in the innermost boss of the master-rod, secures said annular plates against turning movement and, in order to dismantle the connecting-rod assembly, it is only necessary to withdraw said bolt and turn one of the annular plates for a certain distance until the projections thereon are disengaged from the undercut grooves, whereupon the wrist-pins of the articulated rods can be readily removed.

The provision of wrist-pin retaining means as described above allows the length of the wrist-pins to be reduced to a minimum and thus permits of the crank pin being made short and stiff.

One constructional embodiment of this invention is illustrated, by way of example, on the accompanying sheet of drawing, whereon:—

Referring to the drawing:—

Figure 1:
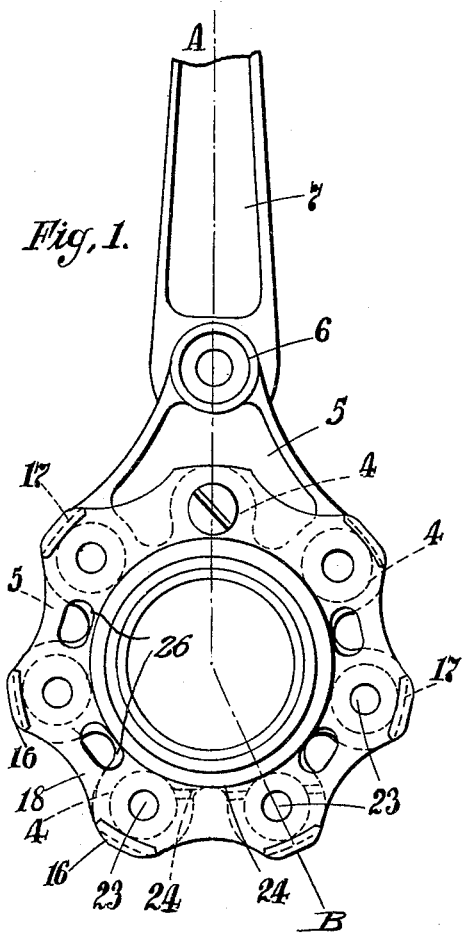
Fig. 1 is a view of one side of the big-end bearing and of part of the master-rod.
Figure 2:
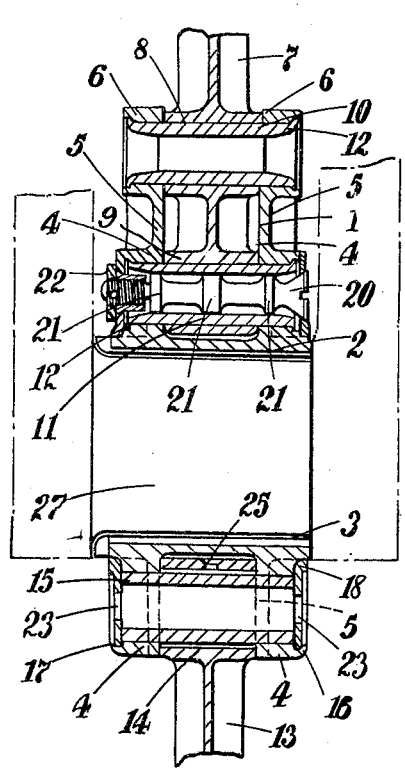
Fig. 2 is a section on the line A—B in Fig. 1.
Figure 3:
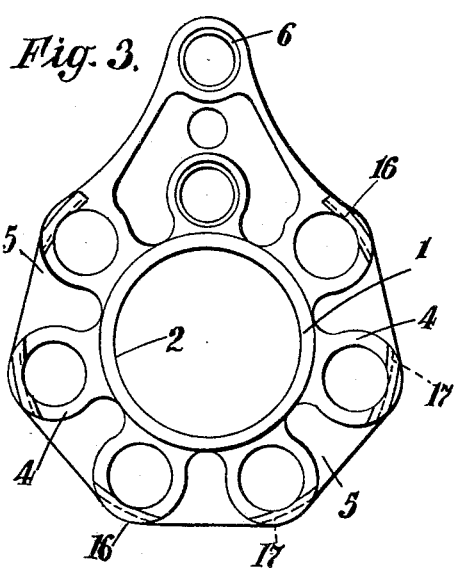
Fig. 3 is a view of one side of the big-end body.
Figure 4:
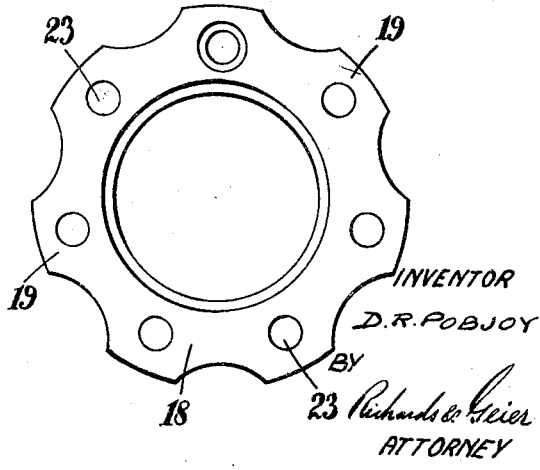
Fig. 4 is a view of one of the wrist pin locking plates.

The big-end body comprises a forged ring 1 of air-hardening steel provided centrally with a bore 2 to receive the big-end bush 3 referred to hereinafter. The said body is formed with two sets of seven bosses 4 which are equidistantly spaced around the ring, one set being disposed on one side of a plane passing through the centre of length of said ring and one on the other side thereof. The seven bosses of each set thereof are interconnected by means of a continuous web 5. A further boss 6 is provided on each of the webs on the big-end body, with its axis at a spaced distance from, and in radial alignment with, the axis of one of the first mentioned bosses.

The master connecting rod 7 is provided with two spaced, apertured bosses 8 and 9, which are arranged between the two pairs of aligned bosses 4 and 6, the said rod being secured to the big-end body by means of two wrist-pins 10 and 11 passed through the bosses on the body and rod 4 and 6 and riveted over at their outer ends 12.

Each of the six articulated connecting rods 13 is formed at its inner end with a bearing boss 14 and is operatively secured to the big-end body by means of a wrist-pin 15, which is passed through co-axial bores in a pair of aligned bosses 4 on said body and through a bore formed in the boss on the rod. The wrist-pins float in the bosses 4 on the big-end body and in the bosses 14 on the articulated rods and, in order to prevent axial movement of the wrist pins, part of the outer peripheral edge of each of the bosses on the body between which the connecting rods are articulated is extended outwardly at 16 and formed with an undercut groove 17 having the centre of the bearing at its center. An annular plate 18, having a number of peripheral projections 19, is arranged with the projections engaged in said grooves 17, and the two plates are secured against turning movement by means of a bolt 20 which is passed through the wrist-pin 11 at the inner end of the master-rod 7 and is supported against the action of centrifugal force by having the three concentric collars 21 with which it is provided fitted snugly in said wrist-pin or in a light alloy sleeve arranged therein. The said bolt is secured against axial movement by means of a nut 22 screwed on to one end thereof.

Holes 23 are drilled in each of said annular plates co-axially with each wrist-pin, so that a certain amount of oil may enter each wrist-pin and provide for the lubrication of the ends thereof. If this is found to be insufficient, however, holes 24 may be formed in the wrist-pin bosses from the space between the two annular plates. The bushed-bearing in each of the articulated connecting rods is lubricated by splash lubrication through holes 25 formed in the boss of the rod. The annular plates may be lightened if desired by the holes 26.

Further, to improve the lubrication, a circular groove may be formed in the inside face of each annular plate passing across the ends of the wrist-pins. Oil trapped between the web 5 and the plate 18 will then be driven by centrifugal forces across the ends of the wrist-pins, particularly if the lightening holes 26 are omitted.

It will be appreciated that the plate 18 lends itself to cheap manufacture by pressing from sheet metal.

In order to dismantle the connecting rod assembly it is only necessary to remove the nut 22 from the afore-said bolt 20 and withdraw the latter. One of the annular plates 18 is then turned through a fourteenth of a complete turn, so that its peripheral projections 19 are disengaged from said undercut grooves 17, whereupon all the wrist-pins may be removed.

The floating bush 3 which is whitemetalled in the inside, is arranged within the centre ring of the big-end body and embraces the crank pin 27.

It will be understood that the constructional details of the invention may be varied. For example, the master-connecting rod could obviously be made integral with the big-end body instead of being separated therefrom as described above and illustrated.

I claim:—

1. Connecting rod assembly comprising a master connecting rod, articulated connecting rods, a big-end body comprising a central ring and secured to said master connecting rod, bosses on said big-end body around said central ring, projections on said bosses having undercut grooves, bearing bosses on said articulated connecting rods, wrist pins connecting said bearing bosses of said articulated connecting rods with said bosses around the central ring, annular plates, projections on said annular plates engaging in said undercut grooves, and a bolt securing said annular plates against turning movement.

2. Connecting rod assembly comprising a master connecting rod, articulated connecting rods, a big-end body comprising a central ring and secured to said master connecting rod, bosses on said big-end body spaced circumferentially around said central ring, projections on said bosses having undercut grooves, bearing bosses on the inner ends of said articulated connecting rods, said bosses around the central ring having a space between them for the reception of said bearing bosses, webs interconnecting said bosses around the central ring, wrist pins connecting said bearing bosses with said bosses around the central ring, annular plates, projections on said annular plates engaging in said undercut grooves, and a bolt passing through one of said wrist pins and securing said annular plates against turning movement.

3. Connecting rod assembly comprising a master connecting rod, said master connecting rod carrying an inner boss and an outer boss, articulated connecting rods, a big-end body comprising a central ring, bosses on said big-end body spaced circumferentially around said central ring, projections on said bosses having undercut grooves, bearing bosses on the inner ends of said articulated connecting rods, said bosses around the central ring having a space between them for the reception of said bearing bosses, webs interconnecting said bosses around the central ring, aligned bosses on said webs, said aligned bosses on said webs being arranged coaxially with the first-mentioned inner boss on said master connecting rod, other bosses on said webs arranged at a spaced distance from, and in radial alignment with, said aligned bosses on said webs and coaxial with the second-mentioned outer boss of said master connecting rod, wrist pins connecting said bearing bosses with said bosses around the central ring, annular plates, projections on said annular plates engaging in said undercut grooves, and a bolt passing through one of said wrist pins and securing said annular plates against turning movement.

4. Connecting rod assembly comprising a master connecting rod, said master connecting rod carrying an inner boss and an outer boss, articulated connecting rods, a big-end body comprising a central ring and connected with said master connecting rod, bosses on said big-end body, projections on said bosses having undercut grooves, bearing bosses on said articulated connecting rods, wrist pins connecting said bearing bosses of said articulated connecting rods with said bosses around the central ring, annular plates, projections on said annular plates engaging in said undercut grooves, and a bolt passing through one of said wrist pins and securing said annular plate against turning movement.

5. Connecting rod assembly comprising a master connecting rod, articulated connecting rods, a big-end body comprising a central ring and secured to said master connecting rod, bosses on said big-end body around said central ring, projections on said bosses having undercut grooves, bearing bosses on said articulated connecting rods, wrist pins connecting said bearing bosses of said articulated connecting rods with said bosses around the central ring, annular plates, projections on said annular plates engaging in said undercut grooves, means securing said annular plates against turning movement, and means securing the first-mentioned means against axial displacement.

DOUGLAS RUDOLF POBJOY.